Dec. 22, 1970         H. J. BALDWIN         3,548,502
MARKING DEVICE FOR MATERIAL CUTTING MACHINE
Filed Aug. 6, 1968                     6 Sheets-Sheet 1

INVENTOR
HERMAN J. BALDWIN
BY Frank C. Leach Jr.
ATTORNEY

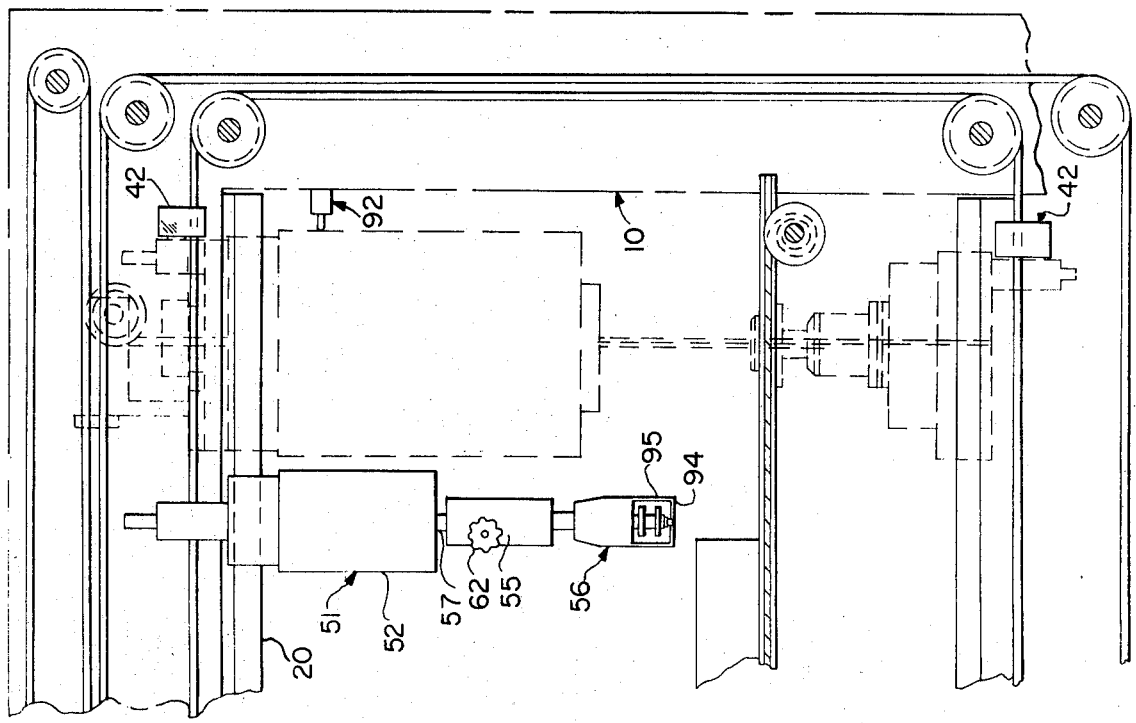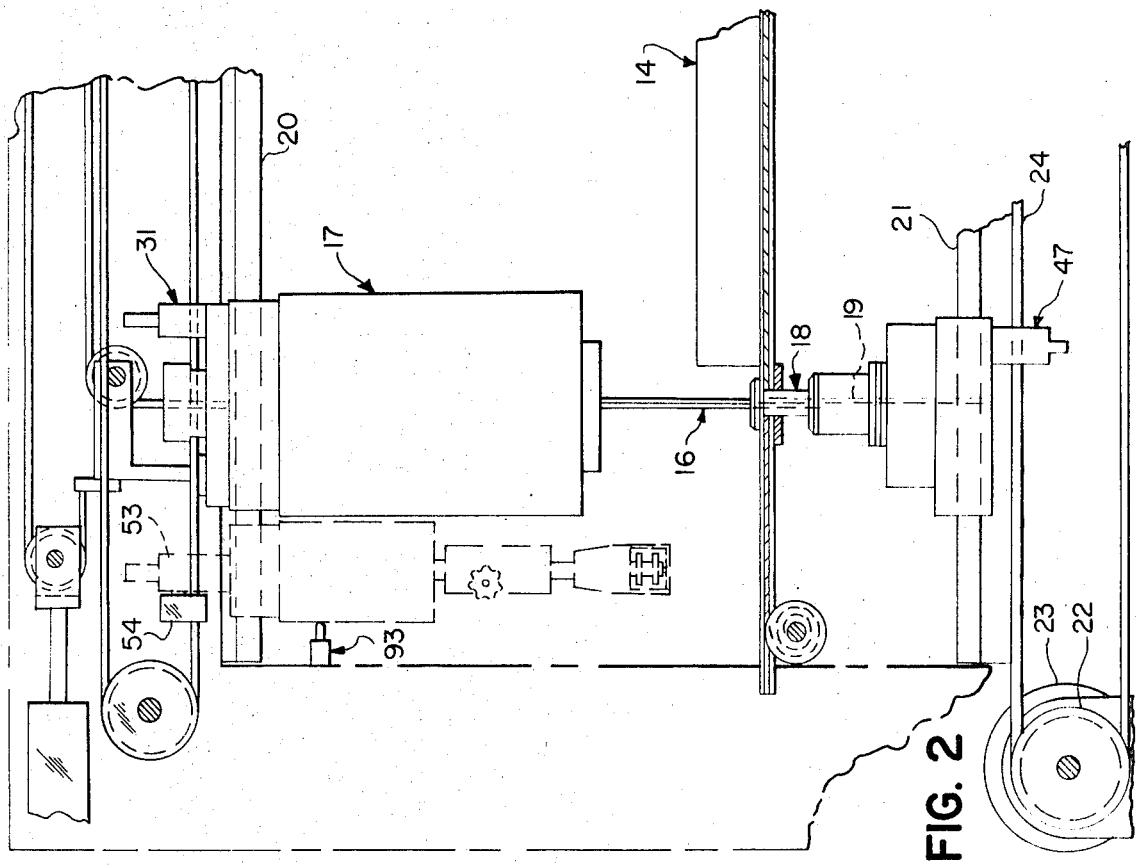
FIG. 2

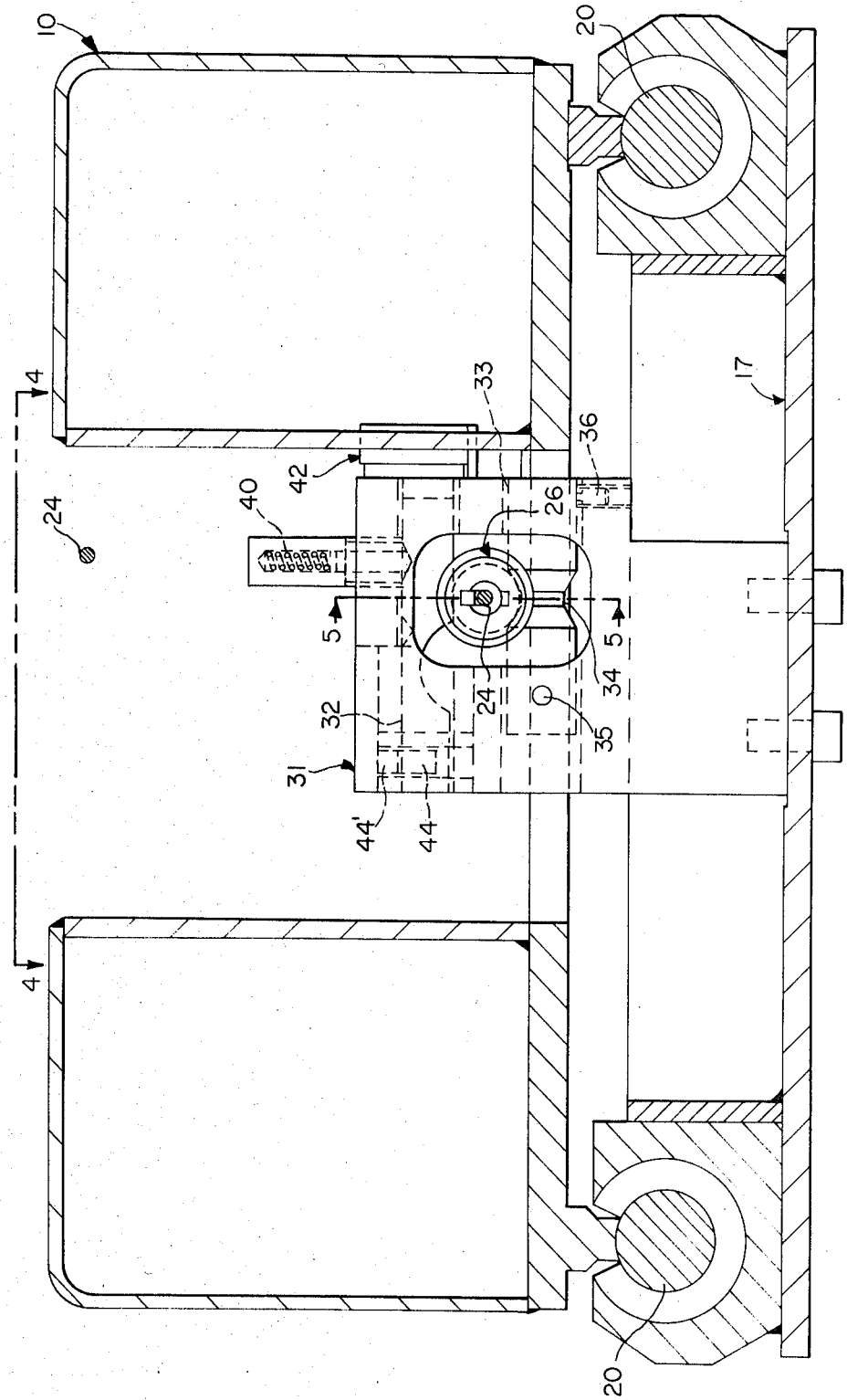

Dec. 22, 1970 H. J. BALDWIN 3,548,502
MARKING DEVICE FOR MATERIAL CUTTING MACHINE
Filed Aug. 6, 1968 6 Sheets-Sheet 4

Dec. 22, 1970  H. J. BALDWIN  3,548,502
MARKING DEVICE FOR MATERIAL CUTTING MACHINE
Filed Aug. 6, 1968  6 Sheets-Sheet 5

Dec. 22, 1970   H. J. BALDWIN   3,548,502
MARKING DEVICE FOR MATERIAL CUTTING MACHINE
Filed Aug. 6, 1968   6 Sheets-Sheet 6

United States Patent Office 3,548,502
Patented Dec. 22, 1970

3,548,502
MARKING DEVICE FOR MATERIAL CUTTING MACHINE
Herman J. Baldwin, Cincinnati, Ohio, assignor to Cincinnati Milacron Inc., a corporation of Ohio
Filed Aug. 6, 1968, Ser. No. 750,538
Int. Cl. B43l 13/00
U.S. Cl. 33—18
16 Claims

ABSTRACT OF THE DISCLOSURE

A material cutting machine has cutting means adapted to be moved transversely of material, which is movable longitudinally relative to the cutting means. The machine has a marking device, which also is adapted to be moved transversely of the material. The machine has means to permit only one of the cutting means and the marking device to be moved transversely at any time. The marking device includes marking means that is movable into engagement with the top of the material to form a mark thereon with the marking device including means to rotate the marking means when the marking means engages the material. The marking device has means to both move the marking means into engagement with the material and away from engagement with the material. The marking device also has means to adjust the position of the marking means relative to the material in accordance with the total thickness of the material being cut.

In material cutting machines of the type in which there is universal movement between the cutting means and the material being cut such as the material cutting machine shown and described in the copending patent application of Edward C. Bruns for "Material Cutting Machine Having Reciprocating Blade With Two Axes of Rotation," Ser. No. 726,658, filed May 6, 1968, and assigned to the same assignee as the assignee of the present application, the pattern in the material is automatically cut. When the material being cut is cloth for suits or other clothing, for example, it is necessary to identify certain locations in each layer of the cloth for the tailor such as pockets, fittings, and shapings, for example.

Markings of this type on cloth, which is being used for making suits or other clothing, has previously been performed manually. Thus, while the material cutting machine of the aforesaid Bruns application substantially reduces the time required for cutting the material and produces a desired pattern in the cloth, it has previously been necessary to mark the cloth manually.

After the cloth has been marked, a relatively long string is then passed through the various marked areas by a needle. After the string has passed through the material, the material is removed from the material cutting machine.

Then, as each of the layers of the cut material is removed from the lay, a piece of each of the strings is cut. These pieces of strings serve to identify to the tailor where various operations in forming the suit, for example, are to be performed. The pieces of strings are retained in the layer of material by friction as the layer of material is removed from the lay of material by the tailor.

The present invention eliminates the requirement for manual marking of the material after the material has had the desired pattern cut therein. Thus, the marking device of the present invention is automatically moved to the various positions at which the material is to be marked. Then, the marking device is moved into engagement with the top of the material to form the mark thereon at the desired position. Accordingly, with the marking device of the present invention, the time required for marking the material, which has had the desired pattern formed therein by the material cutting machine, is substantially reduced. This reduces the total cost.

An object of this invention is to provide a device for marking material that has been cut.

Another object of this invention is to provide a material cutting machine having cutting means and marking means with only one of the marking means and the cutting means being utilized at any time.

A further object of this invention is to provide an automatically controlled material cutting machine in which automatic marking of the material occurs after the pattern has been cut in the material.

Other objects of this invention will be readily perceived from the following description, claims, and drawings.

This invention relates to a material cutting machine comprising cutting means, means to support material to be cut by the cutting means, and means to mark the material. Relative movement in a longitudinal direction between the material supporting means and the cutting means to move the material on the material supporting means relative to the cutting means in a longitudinal direction is produced by suitable means. The material cutting machine has transverse moving means with first means connecting the cutting means to the transverse moving means to move the cutting means transversely to the material and second means connecting the marking means to the transverse moving means to move the marking means transversely to the material. Means allows only one of the first and second connecting means to be activated at any time.

This invention also relates to a device for marking material including marking means with means to support the marking means. Means moves the marking means into engagement with the material to be marked. The marking means is rotated by suitable means when the marking means is in engagement with the material.

The invention further relates to a device for marking material including support means fixed against movement toward and away from the material being marked. The fixed support means has first means secured thereto with second means carried by the first means. The second means, which has marking means supported thereon by suitable means, is moved relative to the first means by suitable means to move the marking means into engagement with the material to be marked. Means rotates the marking means when the marking means is in engagement with the material. The device has means to return the second means to its initial position after the marking means has been rotated by the rotating means.

The attached drawings illustrate a preferred embodiment of the invention, in which:

FIG. 2 is an elevational view, partly in section, of the cutting blade support structure, the marking support structure, the mechanism for lifting the cutting blade from cutting engagement with the material, and the mechanism for moving the cutting blade and the marking structure transversely;

FIG. 3 is a sectional view, partly in side elevation, of a portion of the support structure and the mechanism for connecting and disconnecting the cutting blade support structure to the mechanism for moving the cutting blade transversely;

Figure 1:
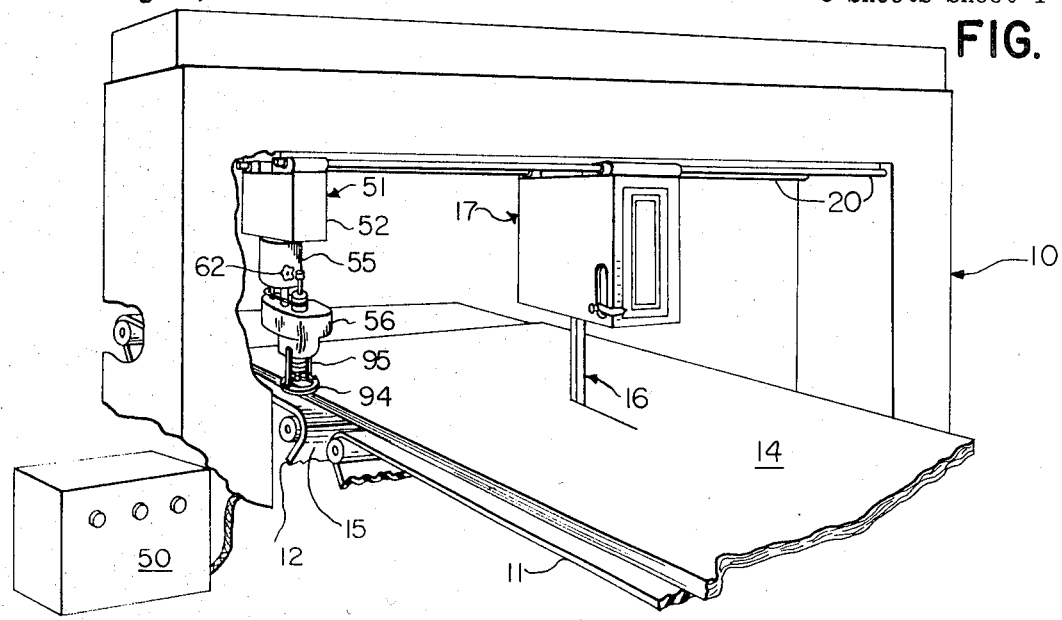
FIG. 1 is a perspective view of a material cutting machine utilizing a marking means of the present invention.
Figure 4:
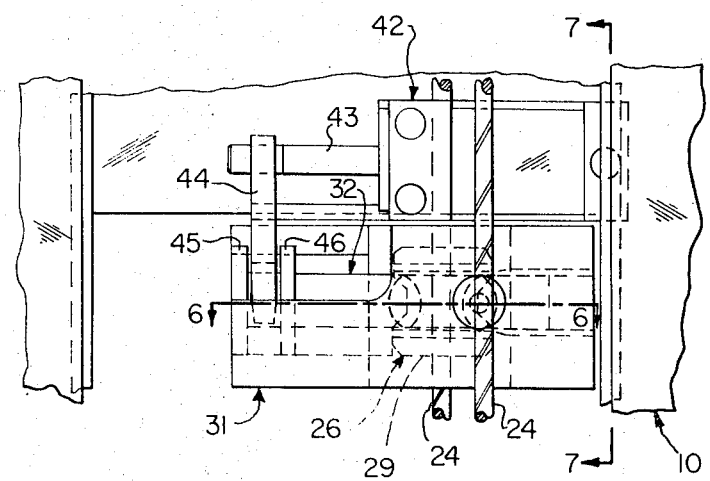
FIG. 4 is a top plan view of a portion of the structure of FIG. 3 and taken along line 4—4 of FIG. 3.

Referring to the drawings and particularly FIG. 1, there is shown a material cutting machine utilizing the marking device of the present invention. The cutting machine is of the type shown and described in the aforesaid Bruns application. The machine includes stationary support means such as a bridge 10. A pair of endless bands or belts 11 and 12 is adapted to support material 14 thereon.

The bands 11 and 12, which are flexible and formed of any suitable material, are driven in unison by a motor to move the material 14 longitudinally relative to the bridge 10 as more particularly shown and described in the aforesaid Bruns application. The material 14 may be a plurality of layers of cloth, for example.

The endless bands 11 and 12 are spaced from each other to form a transverse passage or throat 15 therebetween for the reception of a cutting blade 16. The upper end of the cutting blade 16 is supported within a housing 17 as more particularly shown and described in the aforesaid Bruns application. The lower end of the cutting blade 16 extends into a lower support unit 18 (see FIG. 2) as more particularly shown and described in the aforesaid Bruns application.

During reciprocation of the cutting blade 16 to cut the material 14, the cutting blade 16 is supported by a guide rod 19, which has its lower end disposed within the lower support unit 18 for sliding relation relative thereto as more particularly shown and described in the aforesaid Bruns application. The guide rod 19 is fixed against reciprocation during cutting but is movable with the cutting blade 16 when the cutting blade 16 is lifted from cutting engagement with the material 14.

The cutting blade 16 is movable through the transverse passage 15 by sliding movement of the housing 17 along upper cylindrical rails or ways 20 and the lower support unit 18 along lower cylindrical ways or rails 21. The longitudinal axes of the ways 20 and 21 are disposed substantially parallel to each other. The ways 20 and 21 are supported by the bridge 10.

As more particularly shown and described in the aforesaid Bruns application, the housing 17 and the lower support unit 18 are movable by an apparatus, which includes a drum 22 driven by a reversible motor 23. A continuous cable 24 has its ends attached to the drum 22 and is wound around the drum 22 by being disposed within helical grooves therein.

As more particularly shown and described in the aforesaid Bruns application, the cable 24 passes around a plurality of pulleys, which are rotatably mounted in the bridge 10. The housing 17 and the lower support unit 18 of the present invention are adapted to be connected to and disconnected from the cable 24.

The structure for providing the connection and disconnection between the housing 17 and the cable 24 is shown in FIGS. 3 to 6. Similar structure provides connection and disconnection between the cable 24 and the lower support unit 18 but only the structure cooperating with the cable 24 and the housing 17 will be shown and described in detail.

Figure 5:
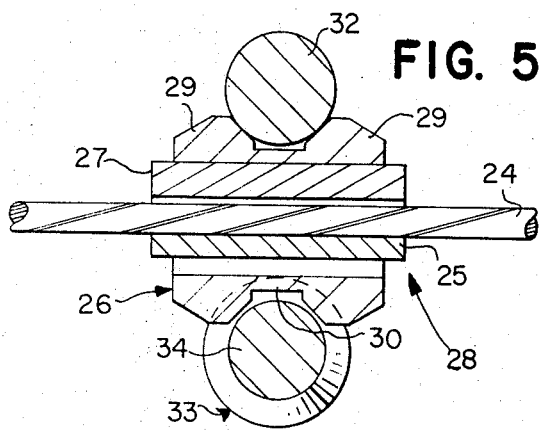
FIG. 5 is an enlarged sectional view showing the connecting arrangement to the transverse moving mechanism and taken along line 5—5 of FIG. 3.

As shown in FIG. 5, the cable 24 has a substantially tubular member 25 fixedly secured thereto by suitable means such as silver soldering, for example. The tubular member 25 is threaded along its entire periphery to permit a connecting member 26 to be threadedly connected thereto.

The tubular member 25 has a slot to receive a key 27 (see FIG. 6), which also is disposed within a slot in the connecting member 26. Accordingly, the connecting member 26 is secured to the annular member 25 to form a connecting unit 28 on the cable 24.

The connecting member 26 has enlarged end portions 29 (see FIG. 5) with a centrally reduced portion 30 therebetween. When suitable means on the housing 17 is clamped to the centrally reduced portion 30 of the member 26, the housing 17 is attached to the cable 24 for movement therewith.

The housing 17 has a casing 31 mounted thereon and into which the connecting unit 28 on the cable 24 may enter. The casing 31 has an upper shaft 32 and a lower shaft 33 mounted therein for cooperation with the reduced portion 30 of the member 26. The upper shaft 32 is adapted to be moved between a position in which the member 26 is clamped between the shafts 32 and 33 and a position in which the member 26 may move freely relative to the shafts 32 and 33.

The lower shaft 33 has a reduced portion 34 (see FIGS. 3, 5, and 6), which is adapted to cooperate with the reduced portion 30 of the member 26. The shaft 33 is mounted in the casing 31 to provide clearance with the connecting unit 28 on the cable 24. Thus, the shaft 33 is mounted on a pivot pin 35 and locked in a desired position by a set screw 36. This permits the desired clearance between the connecting member 26 and the shafts 32 and 33 when the shaft 32 is in the position in which it is desired for the cable 24 to be able to move without moving the housing 17.

The upper shaft 32 has an arcuate portion 37 formed therein and defining a cut out area of sufficient size to permit the member 26 to move relative to the casing 31. When the upper shaft 32 is disposed in the position of FIG. 6, the connecting member 26 is clamped between the upper movable shaft 32 and the lower fixed shaft 33. Therefore, when the shaft 32 is in the position of FIG. 6, the housing 17 is moved with the cable 24 whereby the cutting blade 16 traverses the transverse passage 15.

Figure 6:
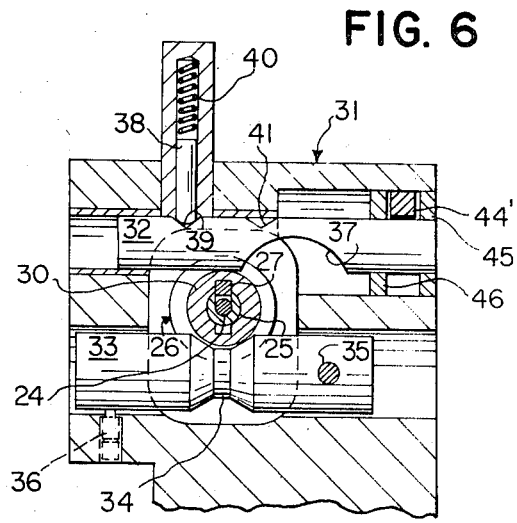
FIG. 6 is a sectional view showing the connection of the connecting means between the cutting blade support structure and the transverse moving mechanism and taken along line 6—6 of FIG. 4.

The upper shaft 32 is held in the position of FIG. 6 by a detent 38, which is carried by the casing 31 of the housing 17. The detent 38 is disposed in a notch 39 in the upper shaft 32. The detent 38 is spring biased into engagement with the notch 39 by a spring 40.

The detent 38 cooperates with a second notch 41 in the upper movable shaft 32 when the shaft 32 is positioned so that the housing 17 is not connected to the cable 24. This is when the shaft 32 is positioned so that the arcuate portion 37 partially surrounds the reduced portion 30 of the connecting member 26 to permit the connecting unit 28 on the cable 24 to move with the cable 24 relative to the casing 31. Thus, the detent 38 insures that the shaft 32 remains in its desired position.

The movable shaft 32 is moved into and out of connecting engagement with the member 26 by suitable control means. The control means includes a fluid cylinder 42 (see FIG. 4), which is preferably an air cylinder, fixedly secured to the bridge 10.

The cylinder 42 has a piston rod 43 movable into and out of the cylinder 42 in accordance with the supply of air to the cylinder 42. The rod 43 is shown in its extended position in FIG. 4 wherein the shaft 32 is positioned, as shown in FIG. 6, to connect the cable 24 to the housing 17.

The rod 43 has a member 44 fixedly secured thereto for cooperation with the movable shaft 32. The member 44 has a finger 44' fitting over the upper surface of the shaft 32. The member 44 is disposed between a pair of annular plates 45 and 46, which are fixedly mounted on the shaft 32 (see FIG. 4). Thus, when the rod 43 is retracted into the cylinder 42 through appropriate control of air supply to the cylinder 42, the shaft 32 is moved to the position in which the arcuate portion 37 cooperates with the reduced portion 30 of the connecting member 26 to disconnect the housing 17 from the cable 24. Of course, the retraction of the rod 43 into the cylinder 42 results in the spring biased detent 38 being removed from the notch 39 and disposed in the notch 41.

It should be understood that the lower support unit 18 is connected to the cable 24 in the same manner as the housing 17 is connected to the cable 24. Of course, the cable 24 will have a second connecting unit fixedly secured thereto and cooperating with shafts in a casing 47 (see FIG. 2), which is fixed to the lower support unit 18, in the same manner as the connecting unit 28, which cooperates with the shafts 32 and 33.

Accordingly, when the housing 17 is connected to the cable 24, the lower support unit 18 also is connected to the cable 24. Thus, when the housing 17 and the lower support unit 18 are connected to the cable 24, rotation of the drum 22 results in movement of the cutting blade 16 through the transverse passage 15.

The movement of the cutting blade 16 in the transverse passage 15, the longitudinal movement of the material 14 relative to the cutting blade 16 by the endless bands 11 and 12, and rotation of the cutting blade 16 about two different vertical axes are controlled through a numerical control apparatus 50 (see FIG. 1) as more particularly shown and described in the aforesaid Bruns application. The cutting blade 16 may have any configuration such as that shown in the aforesaid Bruns application, for example. The numerical control apparatus 50 also is utilized to control the supply of air to the cylinders 42.

As shown in FIG. 2, the material cutting machine of the present invention has a marking device 51 mounted on the upper cylindrical ways 20 for sliding movement thereon. The marking device 51 includes an upper slidable support carrier 52 that is slidably mounted on the cylindrical ways 20. The upper surface of the support carrier 52 also has a casing 53, which is similar to the casing 31, mounted thereon in the same manner as shown and described for mounting the casing 31 on the housing 17. The casing 53 includes the same structure as the casing 31 wherein the marking device 51 may be connected to or disconnected from the cable 24 through the connecting unit 28 by means of the shafts in the casing 53 clamping the connecting member 26 of the connecting unit 28 therebetween.

The bridge 10 has a second air cylinder 54 mounted thereon for cooperation with the movable shaft of the casing 53 in the same manner that the air cylinder 42 cooperates with the movable shaft 32 of the casing 31. Thus, the cylinder 54 controls the connection and disconnection between the marking device 51 and the cable 24.

It should be understood that the cable 24 has only the single connecting unit 28 thereon for cooperation with either the casing 31 of the casing 53. Accordingly, it is necessary for the connecting unit 28 of the cable 24 to be disconnected from the housing 17 and the cable 24 to be moved to the position in which the shafts of the casing 53 may be clamped to the connecting unit 28 of the cable 24 before there can be any connection of the marking device 51 to the cable 24. Furthermore, it is necessary for the lower support unit 18 to also be disconnected from the second connecting unit, which is clamped between the movable and fixed shafts in the casing 47, on the cable 24 before the cable 24 may be moved to the position in which the marking device 51 may be connected to the cable 24.

The movements of the cable 24 and the connections and disconnections between the cable 24 and the housing 17, the lower support unit 18, and the marking device 51 are controlled by the numerical control apparatus 50. Thus, suitable signals must be supplied to the numerical control apparatus 50 before the connecting unit 28 of the cable 24 is moved from the casing 31 to the casing 53. Furthermore, the cylinder 54 cannot be actuated to move the movable shaft of the casing 53 before the connecting unit 28 of the cable 24 is positioned for clamping by the movable shaft of the casing 53.

The marking device 51 includes an upper unit 55, which is carried by the support carrier 52, and a lower unit 56. The lower unit 56 is movable relative to the upper unit 55 and both of the units 55 and 56 are movable relative to the support carrier 52.

Figure 9:
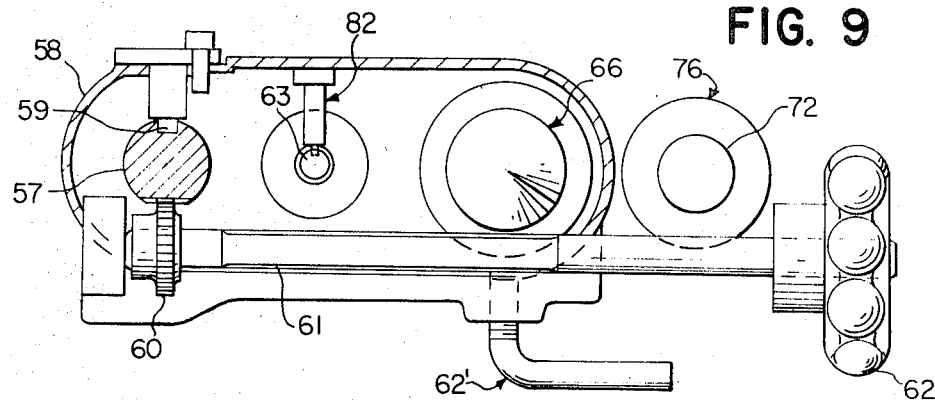
FIG. 9 is a top plan view, partly in section, of the structure of FIG. 8 with some parts omitted for clarity purposes.
Figure 7:
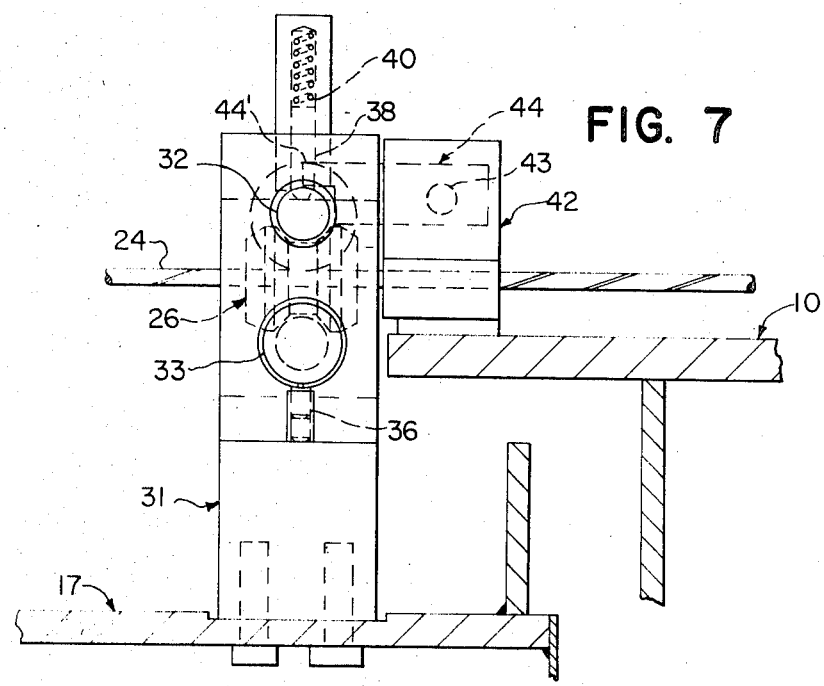
FIG. 7 is a side elevational view, partly in section, of a portion of the structure of FIG. 4 and taken along line 7—7 of FIG. 4.
Figure 8:
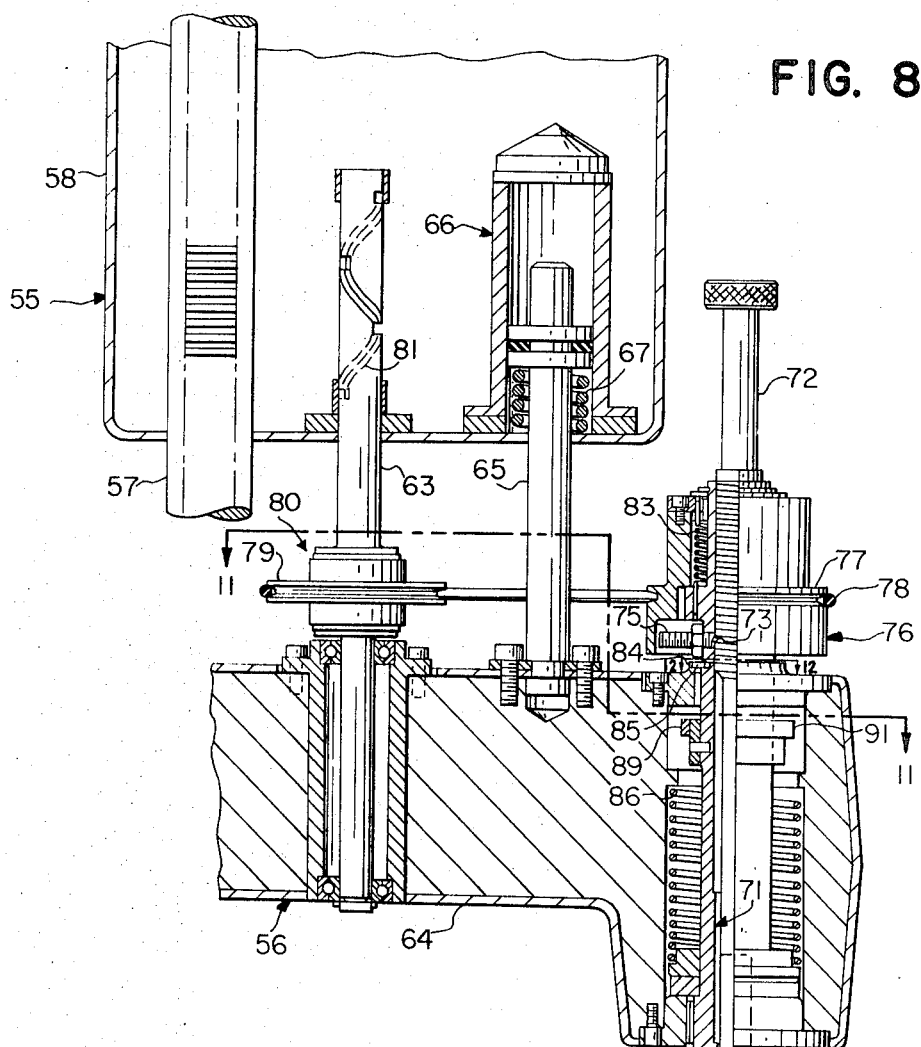
FIG. 8 is an enlarged sectional view of a portion of the marking device of the present invention.

The support carrier 52 has a rod 57 fixedly secured thereto and extending downwardly therefrom to support the upper unit 55 and the lower unit 56 thereon for vertical movement together relative to the support carrier 52. The rod 57 extends through a housing 58 (see FIG. 8) of the upper support unit 55. The housing 58 has a pin 59 (see FIG. 9) mounted therein for cooperation with a longitudinal slot in the rod 57 to prevent any rotation between the housing 58 and the rod 57.

The rod 57 has rack teeth thereon for cooperation with a pinion gear 60 (see FIG. 9), which is fixedly mounted on a shaft 61 carried by the housing 58. Since rotation of the housing 58 relative to the rod 57 is prevented by the pin 59 being disposed in the longitudinal slot in the rod 57, rotation of the shaft 61 by a knob 62 thereon will result in the pinion gear 60 moving along the rod 57. Thus, this movement of the pinion gear 60 results in the upper unit 55 and the lower unit 56 being adjusted with respect to the carrier 52. This adjustment is utilized to correctly position the lower unit 56 relative to the material 14 in accordance with the total thickness of the material 14, which is to be marked. A clamp 62' engages against the shaft 61 to retain the shaft 61 against movement so that the units 55 and 56 will be retained in the desired position.

The housing 58 of the upper unit 55 has a shaft 63 rotatably mounted therein with its lower end connected to a housing 64 of the lower unit 56 so that the shaft 63 is rotatably mounted in the housing 64. Since the shaft 63 is movable with the housing 64 relative to the housing 58, the shaft 63 must be slidably mounted in the housing 58 as well as being rotatably mounted therein.

The lower unit 56 is moved relative to the upper unit 55 by actuating means including a piston rod 65 of an air cylinder 66. The piston rod 65 is fixedly secured to the housing 64 of the lower unit 56 while the air cylinder 66 is fixedly secured to the housing 58 of the upper unit 55. Accordingly, when air is supplied to the air cylinder 66, the piston rod 65 is extended from the air cylinder 66 to move the lower unit 56 downwardly relative to the upper unit 55.

A spring 67 (see FIG. 8) is disposed within the cylinder 66 and acts on the piston rod 65 to return the rod 65 to its upper or retracted position whenever the air within the cylinder 66 is removed therefrom. Thus, the spring 67 moves the lower unit 56 upwardly relative to the upper unit 55 to return the lower unit 56 to its rest position.

The housing 64 of the lower unit 56 also carries a marking member 68, which may be chalk, for example. The chalk may be of various colors such as white chalk for dark color cloth and green chalk for light color cloth, for example. The marking member 68 may be formed of any other suitable material that is capable of temporarily marking the material 14 and then being erased or removed from the material 14 without any damage to the material 14.

The marking member 68 is carried within a chuck 69 having a resilient portion 70 for grasping the marking member 68. This prevents any accidental breaking of the marking member 68.

The chuck 69 is carried at the lower end of a spindle 71, which is rotatably supported in the housing 64 of the lower unit 56. The spindle 71 is hollow to receive an adjustment screw 72, which has its lower end bearing against the upper end of the marking member 68. As the marking member 68 wears due to use, the adjustment screw 72 is adjusted to move the marking member 68 out of the chuck 69 the necessary distance.

Figure 10:
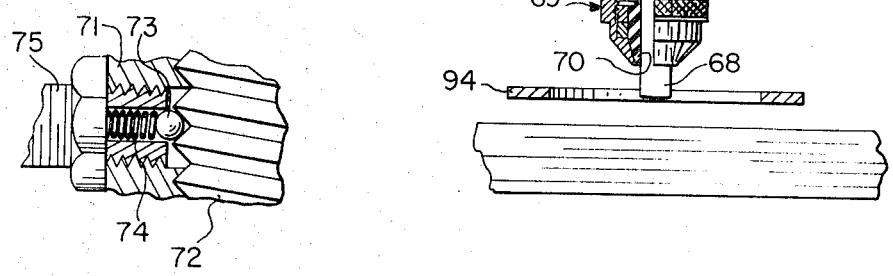
FIG. 10 is an enlarged fragmentary view of a portion of the structure of FIG. 8 and showing the arrangement for retaining the marker adjustment means in its adjusted position.

The adjustment screw 72 is retained in its adjusted position by a ball 73 (see FIG. 10), which is biased into engagement with one of the threads of the screw 72 by a spring 74. The spring 74 is carried within a screw 75, which is supported in the spindle 71. Thus, the adjustment screw 72 is locked in its adjusted position to the spindle 71. The force exerted by turning the adjustment screw 72 permits the adjustment screw 72 to overcome the ball 73 to move the marking member 68 outwardly from the chuck 69 when adjustment is required.

The spindle 71 has a housing 76 rotatably mounted thereon with a pulley 77 formed on the outer surface of the housing 76 and integral therewith. The housing 76 is rotated by a drive belt 78, which cooperates with the pulley 77 and a pulley 79 on the shaft 63. Thus, rotation of the pulley 79 by the shaft 63 causes rotation of the housing 76.

The pulley 79 is connected to the shaft 63 through a clutch 80, which permits driving of the pulley 79 in only one direction. The clutch 80 becomes free running in the other direction of rotation of the pulley 79 and the shaft 63 whereby rotation of the shaft 63 in only one direction causes rotation of the pulley 79.

The shaft 63 has a spiral groove 81 therein for cooperating with a cam finger 82, which is carried by the housing 58 of the upper support unit 55. Thus, when there is relative movement between the shaft 63 and the housing 58, the shaft 63 rotates. This relative movement occurs during movement of the lower unit 56 away from and toward the upper unit 55 due to the air cylinder 66 and the cooperating spring 67 therein. However, it is only during the downward movement of the lower unit 56 away from the upper unit 55 that the clutch 80 is effective to cause rotation of the pulley 79.

Figure 12:
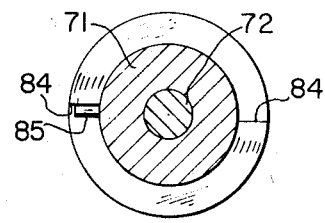
FIG. 12 is a top plan view, partly in section, showing the pin and cams arrangement for holding the spindle of the marking device against rotation and taken along line 12—12 of FIG. 8.

The housing 76 has one end of a spring 83 fixedly secured thereto while the other end of the spring 83 is secured to the spindle 71. Accordingly, when the housing 76 is rotated by the pulley 79, the spring 83 is wound up and absorbs energy because the spindle 71 cannot rotate at this time. The spindle 71 is prevented from rotating due to cooperation of a pair of diametrically disposed cams 84 on the housing 64 and a pin 85 (see FIG. 12) on the spindle 71. A spring 86, which is disposed within the housing 64, urges the spindle 71 downwardly relative to the housing 64 to the position in which the pin 85 engages one of the cams 84.

Thus, as the lower unit 56 is moved downwardly by the supply of air to the cylinder 66, the spring 83 is wound up through rotation of the housing 76 by the shaft 63. When the marking member 68 contacts the top of the material 14, which is to be marked, the pin 85 is moved upwardly past one of the cams 84 by the force exerted by the material 14 against the marking member 68.

The upward force on the spindle 71 due to engagement of the marking member 68 is sufficient to overcome the force of the spring 86. This results in the pin 85 no longer preventing rotation of the spindle 71 by the spring 83.

As a result, the spring 83 is unwound and rotates the marking member 68 to produce a mark on the top of the material 14. Because the clutch 80 is free running in one direction, the housing 76 is held against rotation when the spring 83 is unwound. As a result, only the spindle 71 is rotated during unwinding of the spring 83.

The numerical control apparatus 50 will not permit the release of the air within the cylinder 66 until marking of the material 14 has occurred. Thus, rotation of the spindle 71 and the marking member 68 must occur before the numerical control apparatus 50 will release the air from the cylinder 66 and allow the spring 67 to move the lower unit 56 upwardly to its rest position.

Figure 11:
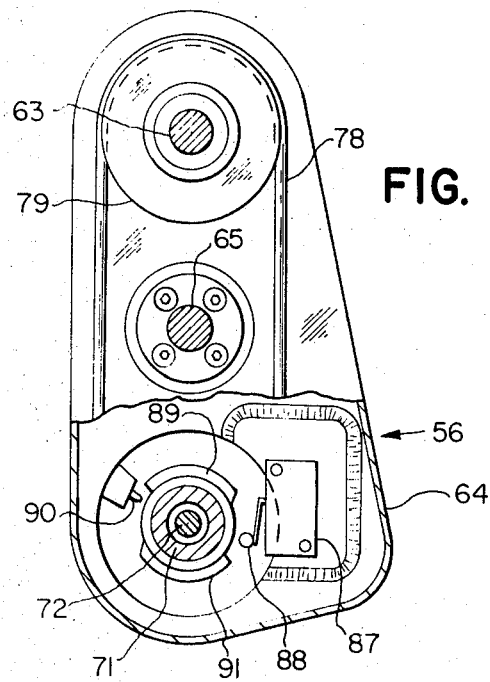
FIG. 11 is a plan view, partly in section, of the structure of FIG. 8 showing a switch and cam arrangement and taken along line 11—11 of FIG. 8.

An electrical signal to the numerical control apparatus 50 is provided by a switch 87 (see FIG. 11), which is fixedly secured to the housing 64. The switch 87 has an arm 88 that is engaged by a cam 89 on the spindle 71 when the spindle 71 is rotated. The arm 88 is not engaged by the cam 89 until 45° of rotation of the marking member 68 has occurred. This will be sufficient rotation of the marking member 68 to produce the mark on the material 14. When the arm 88 of the switch 87 is actuated by the cam 89, the numerical control apparatus 50 receives an electrical signal whereby the numerical control apparatus 50 now permits the air to be removed from the cylinder 66.

The housing 64 also carries a spring biased stop 90 for cooperation with the cam 89 to prevent rotation of the spindle 71 in the counter-clockwise (as viewed in FIG. 11) direction when the spring 83 unwinds. Because the stop 90 is spring biased, it will permit rotation of the spindle 71 in the clockwise (as viewed in FIG. 11) direction to unwind the spring 83. Thus, the spring biased stop 90 is moved inwardly when a cam 91, which is diametrically disposed to the cam 89, on the spindle 71 contacts it as the spindle 71 is rotated clockwise (as viewed in FIG. 11). The spring 83 is sufficiently wound to permit 180° of rotation of the spindle 71. This is necessary in order for there to be proper positioning of the cams 89 and 91 with respect to the switch arm 88 and the spring biased stop 90 when the next marking cycle occurs.

Considering the operation of the present invention, the material cutting machine will have completed cutting of the desired pattern in the material 14 before the marking device 51 is utilized. Thus, the cutting blade 16 will have been maneuvered in conjunction with the endless bands 11 and 12 through being controlled by the numerical control apparatus 50 as more particularly shown and described in the aforesaid Bruns application. During this time, the cable 24 is connected to the housing 17 and the lower support unit 18 and the marking device 51 is not connected to the cable 24.

When formation of the pattern in the material 14 has been completed, the housing 17 and the lower support unit 18 are returned to one side of the bridge 10 beyond the edge of the material 14 as shown in phantom lines in FIG. 2. The housing 17 and the lower support unit 18 are moved sufficiently away from the edge of the material 14 to permit the marking device 51 to be capable of moving to the edge of the material 14 and beyond a slight amount as shown in the solid line position in FIG. 2.

With the numerical control apparatus 50 receiving a signal from an electric switch 92 on the bridge 10 that the housing 17 and the lower unit 18 are positioned as shown in FIG. 2 in their parked (dotted line) position due to the housing 17 actuating the switch 92 when the housing 17 is in its parked position, the numerical control apparatus 50 then causes air to be supplied to the cylinder 42 to shift the movable shaft 32 away from the position of FIG. 6 whereby the connecting member 26 is no longer clamped between the movable shaft 32 and the fixed shaft 33. Accordingly, when the piston rod 43 is retracted into the cylinder 42, the housing 17 is disconnected from the cable 24. A similar operation occurs between the lower support unit 18 and the second connecting unit on the cable 24 to disconnect the lower support unit 18 from the cable 24.

The numerical control apparatus 50 then energizes the motor 23 to advance the cable 24 in a direction so as to move the connecting member 26 out of the casing 31 and into the casing 53. With the member 26 disposed within the casing 53, the numerical control apparatus 50 causes actuation of the air cylinder 54 to cause the movable shaft of the casing 53 to clamp the connecting member 26 between the movable and fixed shafts of the casing 53. At this time, the marking device 51 is secured to the cable 24 for movement therewith.

The numerical control apparatus 50 then moves the marking device 51 transversely and the endless bands 11 and 12 longitudinally in coordination therewith to position the marking device 51 at the various positions at which the material 14 is to be marked by the marking member 68. When the marking device 51 is disposed at one of the positions at which the material 14 is to be marked to indicate where an opening in the material 14 for a pocket is located, for example, the numerical control apparatus 50 then permits air to be supplied to the air cylinder 66 to move the lower unit 56 downwardly away from the upper unit 55 of the marking device 51.

During this downward movement, the shaft 63 rotates and causes the rotatable housing 76 to rotate through the belt 78. As a result, the spring 83 is wound to absorb energy because the spindle 71 is prevented from rotating due to the cooperation between one of the cams 84 and the pin 85.

When the marking member 68 engages the top of the material 14, the pin 85 is moved upwardly slightly and out of engagement with one of the cams 84 whereby the spring 83 unwinds to rotate the spindle 71 in the opposite direction to that which the housing 76 rotated during winding up of the spring 83. The rotation of the spindle 71 causes the marking member 68 to rotate whereby a mark is made on the top of the material 14. It should be understood that the spring 86 returns the pin 85 into the plane of the cams 84 for engagement with the other of the cams 84 before completion of 180° of rotation of the spindle 71.

Because rotation of the spindle 71 causes actuation of the switch 87 through engagement of the arm 88 by one of the cams 89 and 91 on the spindle 71, the numerical control apparatus 50 causes the air within the cylinder 66 to be withdrawn. As a result, the spring 67 returns the lower unit 56 to its rest position adjacent the upper unit 55.

As soon as the lower unit 56 completes its upward movement, the numerical control apparatus 50 may then move the marking device 51 to the next position in which the material is to be marked. Thus, marking of the material 14 may occur in a relatively short time when utilizing the present invention.

When marking is completed, the marking device 51 is returned to its parked (dotted line) position as shown in FIG. 2. In this position, the numerical control apparatus 50 receives a signal from an electrical switch 93 on the bridge 10 due to the support carrier 52 of the marking device 51 actuating the switch 93. As a result, the numerical control apparatus 50 shifts the movable shaft of the casing 53 to release the connecting member 26 from clamping between the movable and fixed shafts of the casing 53.

The numerical control apparatus 50 then energizes the motor 23 in a direction so as to move the connecting member 26 out of the casing 53 and into the casing 31. This also results in the second connecting unit on the cable 24 being moved into the casing 47. Then, the numerical control apparatus 50 causes clamping of the cable 24 within the casings 31 and 47. Accordingly, the cutting blade 16 may again be moved through the transverse passage 15.

It should be understood that the position of the upper unit 55 and the lower unit 56 relative to the bands 11 and 12 is adjusted in accordance with the total thickness of the material 14. Accordingly, when the total thickness of the material 14 is relatively small, the knob 62 will be rotated to move the lower unit 56 and the upper unit 55 downwardly so as to be closer to the bands 11 and 12. Likewise, when the total thickness of the material 14 increases, the knob 62 will be rotated in the opposite direction to lift the upper unit 55 and the lower unit 56 further away from the endless bands 11 and 12. This insures that the travel distance of the marking member 68 from its rest position to its marking position is the same irrespective of the total thickness of the material 14.

It should be understood that an annular plate 94 initially engages the top of the material 14 whenever the marking member 68 is moved downwardly. The plate 94, which is supported from the housing 64 by a pair of legs 95, prevents the marking member 68 from engaging the top of the material 14 with such force that the marking member 68 would be broken.

An advantage of this invention is that it permits automatic marking of material after a desired pattern has been cut in the material. Another advantage of this invention is that it produces material ready for tailoring.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A material cutting machine comprising:
   cutting means;
   means to support material to be cut by said cutting means;
   means to produce relative movement in a longitudinal direction between said material supporting means and said cutting means to move one of the material on said material supporting means and said cutting means relative to the other in a longitudinal direction;
   transverse moving means;
   first means selectively connecting said cutting means to said transverse moving means to move said cutting means transversely to the material;
   means to mark the material;
   second means selectively connecting said marking means to said transverse moving means to move said marking means transversely to the material;
   and means to control said first connecting means and said second connecting means to allow only one of said first connecting means and said second connecting means to be activated at any time.

2. The material cutting machine according to claim 1 in which said longitudinal moving means moves only said material supporting means in a longitudinal direction.

3. The materal cutting machine according to claim 1 in which said transverse moving means includes:
   a driven cable;
   and means secured to said cable;
   said first connecting means includes means secured to said cutting means;
   and said secured means cooperating with said secured means of said transverse moving means for connection thereto;
   and said second connecting means includes: means secured to said marking means;
   and said secured means cooperating with said secured means of said transverse moving means for connection thereto.

4. The material cutting machine according to claim 3 including:
   means to support said transverse moving means;
   said support means having first means secured thereto for moving said secured means of said first connecting means into and out of cooperating engagement with said secured means of said transverse moving means to connect and disconnect said cutting means to and from said transverse moving means;

and said support means having second means secured thereto for moving said secured means of said second connecting means into and out of engagement with said secured means of said transverse moving means to connect and disconnect said marking means to and from said transverse moving means.

5. The material cutting machine according to claim 4 including:
said cutting means having means to lock said secured means of said first connecting means in either its connected or disconnected position;
and said marking means having means to lock said secured means of said second connecting means in either its connected or disconnected position.

6. The material cutting machine according to claim 1 in which said marking means includes:
a marking member;
means to support said marking member, said support means being connected to said second connecting means;
means to move said marking member into engagement with the material to be marked when said second connecting means is connected to said transverse moving means;
and means to rotate said marking member in response to said marking means engaging the material.

7. The material cutting machine according to claim 1 in which said transverse moving means includes:
means secured thereto for cooperation with said first connecting means and said second connecting means;
said first connecting means cooperating with said secured means to connect said cutting means to said transverse moving means;
and said second connecting means cooperating with said secured means to connect said marking means to said transverse moving means.

8. The material cutting machine according to claim 1 including:
means to store said cutting means adjacent one of the longitudinal sides of said material supporting means and said marking means adjacent the other of the longitudinal sides of said material supporting means;
and means to prevent one of said cutting means and said marking means from being connected to said transverse moving means until the other of said cutting means and said marking means is in its stored position.

9. A device for marking material including:
marking means;
means to support said marking means;
means to move said marking means into engagement with the material to be marked;
means to rotate said marking means when said marking means is in engagement with the material;
and means movable in response to said means to rotate said marking means to move said marking means away from engagement with the material after said marking means has been rotated by said rotating means.

10. The marking device according to claim 9 including means to adjust the position of said marking means relative to said support means to compensate for wear of said marking means.

11. The marking device according to claim 9 including:
support means fixed against movement relative to the material being marked;
and means to attach said support means for said marking means to said fixed support means for movement relative thereto toward and away from the material being marked.

12. The marking device according to claim 11 including means to adjust the position of said support means for said marking means relative to said fixed support means in accordance with the total thickness of the material being marked.

13. A device for marking material including:
support means fixed against movement toward and away from the material being marked;
first means secured to said fixed support means;
second means carried by said first means;
marking means;
means to support said marking means on said second means;
means to move said second means relative to said first means to move said marking means into engagement with the material to be marked;
means to rotate said marking means when said marking means is in engagement with the material;
means to return said second means to its initial position after said marking means has been rotated by said rotating means to remove said marking means from engagement with the material;
and means to render said return means effective in response to rotation of said marking means by said rotating means.

14. The marking device according to claim 13 including means to adjust the position of said first means and said second means simultaneously relative to said fixed support means to position said marking means a predetermined distance from the top of the material being marked in accordance with the total thickness of the material being marked.

15. The marking device according to claim 13 in which:
said rotating means includes energy storing means;
means to store energy in said energy storing means when said second means is moved away from said first means by said moving means to move said marking means into engagement with the material;
and means to release the stored energy from said energy storing means to rotate said marking means when said marking means is in engagement with the material.

16. A device for marking material including:
marking means;
means to support said marking means;
means to move said marking means into engagement with the material to be marked;
means to rotate said marking means when said marking means is in engagement with the material;
support means fixed against movement relative to the material being marked;
means to attach said support means for said marking means to said fixed support means for movement relative thereto toward and away from the material being marked;
said rotating means includes energy storing means;
means to store energy in said energy storing means when said support means for said marking means is moved to move said marking means into engagement with the material;
and means to release the stored energy from said energy storing means to rotate said marking means when said marking means is in engagement with the material.

References Cited
UNITED STATES PATENTS

| | | | |
|---|---|---|---|
| 1,092,177 | 4/1914 | Seaman | 33—9 |
| 2,734,272 | 2/1956 | Brown | 33—27(C) |
| 2,792,631 | 5/1957 | Nock | 33—9 |
| 3,292,262 | 12/1966 | Moll | 33—27(C) |
| 3,350,969 | 11/1967 | Wiatt et al. | 83—428 |

HARRY N. HAROIAN, Primary Examiner

U.S. Cl. X.R.

83—428

UNITED STATES PATENT OFFICE
CERTIFICATE OF CORRECTION

Patent No. 3,548,502    Dated December 22, 1970

Inventor(s) Herman J. Baldwin

It is certified that error appears in the above-identified patent and that said Letters Patent are hereby corrected as shown below:

Column 2, line 38, "The" should read -- This --. Column line 62, "of" should read -- or --. Column 10, line 53, after "which" insert a colon; line 53, "said" should be the start of a paragraph; line 54, "a" should be the start of a sub-paragraph; line 55, "and" should be the start of a sub-paragr line 56, after "includes" insert a colon; line 56, "means", second occurrence, should be the start of a sub-paragraph; line 58, "and" should be the start of a sub-paragraph; line 6 "means", second occurrence, should be the start of a sub-paragraph; line 63, "and" should be the start of a sub-paragr Signed and sealed this 1st day of June 1971.

(SEAL)
Attest:

EDWARD M. FLETCHER, JR.  
Attesting Officer

WILLIAM E. SCHUYLER, JR.  
Commissioner of Patents